US007996885B2

(12) United States Patent
Jaiswal et al.

(10) Patent No.: US 7,996,885 B2
(45) Date of Patent: Aug. 9, 2011

(54) PASSWORD APPLICATION

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/737,262

(22) Filed: Apr. 19, 2007

(65) Prior Publication Data

US 2008/0263643 A1  Oct. 23, 2008

(51) Int. Cl.
*H04L 9/32* (2006.01)

(52) U.S. Cl. .................. 726/6; 707/102; 707/1

(58) Field of Classification Search .......... 726/9, 26, 726/27, 28, 29; 713/224, 201, 212, 213, 713/220, 223; 380/200, 201, 202, 203, 227; 709/204, 201, 220, 227
See application file for complete search history.

(56) References Cited

U.S. PATENT DOCUMENTS

| | | | |
|---|---|---|---|
| 6,178,508 | B1 | 1/2001 | Kaufman |
| 2002/0083012 | A1 | 6/2002 | Bush et al. |
| 2003/0110401 | A1 | 6/2003 | Aoshima et al. |
| 2004/0215534 | A1 | 10/2004 | Gautier et al. |
| 2006/0080352 | A1 * | 4/2006 | Boubez et al. ........... 707/102 |
| 2006/0161783 | A1 | 7/2006 | Aiken et al. |
| 2006/0294051 | A1 * | 12/2006 | Kapadia et al. ............. 707/1 |

OTHER PUBLICATIONS

University of Massichusetts Amherst, "Manage Groups", Office of Information Technologies, last revised Jan. 18, 2006, 6 pages, http://www.oit.umass.edu/udrive/share/manage_groups.htm.
Microsoft Corporation, Host Integration Server 2000 Resource Kit, Chapter 2—"Overview of Host Integration Server 2000 Componentst", 2007, 22 pages, http://www.microsoft.com/technet/prodtechnol/host/reskit/part1/hisrkc02.mspx?mfr=true.

* cited by examiner

*Primary Examiner* — Vivek Srivastava
*Assistant Examiner* — Nega Woldemariam
(74) *Attorney, Agent, or Firm* — Patrick J. Daugherty; Driggs, Hogg, Daugherty & Del Zoppo Co., LPA

(57) ABSTRACT

Methods, systems, and program products for a client application provide child passwords mapped to a parent password authorized for login to a secure network resource server. A child user logs in to the client application by entering the child password. When a child user properly requests a secure resource from the secure network resource server, the client application uses the authorized parent password to login to the secure server and retrieve a secure resource without communicating the child password to the secure server. The child user login session is administered by the local application pursuant to access rules or limitation parameters associated with the child password. Child passwords may be set to expire. The client application may also monitor secure server access by a child user; monitored use may also be reported, and an access rule or password limitation parameter may be revised in response to monitoring and use reporting.

24 Claims, 1 Drawing Sheet

PASSWORD APPLICATION

FIELD OF THE INVENTION

The present invention relates to secure network service and data access through password methods and system configurations. More particularly, the present invention relates to providing access to a secure network through the use of multiple dependant child passwords associated with a parent authorized password.

BACKGROUND OF THE INVENTION

It is known to provide user access to secure computer systems through password-entry methods and systems. In a password access scheme, a user gains access to secure systems, services or data ("secure resource") by providing an appropriate password to a secure user interface through a login procedure, wherein the access granted is typically based upon access rules associated with the password. Thus, in general, the security of the secure resource system is dependent upon password security.

However, it is sometimes desirable for authorized parties to provide access to secure resources to non-authorized users, for example to present or potential business clients and customers, or to other employees or agents within a common employment or agency context. Accordingly, it is known for authorized users to provide their passwords to non-authorized parties to enable them to login and access a secure resource, which creates a number of problems.

First, providing a confidential password to an unauthorized third party user necessarily destroys the confidentiality of the password, even where the third party access is intended to be of only a temporary nature. Once lost confidentiality cannot be recovered, and security must generally be reestablished through removal of recognition of the compromised password and creation of a new password. This creates inefficiencies through imposing additional administrative requirements on secure system administration and on the authorized user.

Secondly, neither the authorized user nor a system administrator entity may be able to monitor or control the extent of the secure resource access granted to the unauthorized third party. The third party may appear to the system as the authorized party and enjoy his full rights and access privileges, though perhaps only a subset of the secure resources were intended to be provided, or over a limited timeframe or other limited access basis. Thirdly, since the third party has logged on as the authorized user there may be no means to differentiate and track respective authorized party and unauthorized third party accesses to secure resources, and thus misappropriation or other abuse of resource access may be wrongfully attributed to an innocent authorized user.

Problems also arise where a secure resource provider system must provide different degrees of resource access to different users. More particularly, it is common for some authorized users to enjoy limited levels of security permission for access to secure server resources relative to others: for example access to employee social security numbers may be restricted to only a defined first user or group of users. And the number of different levels and permissions that must be administered may increase greatly, and with increasing complexity, for network server resources serving client application users over the Internet. For example, large financial services providers may need to provide network access to secure resources to thousands of individual account holders each located within one or more of a plurality of divergent governmental jurisdictions, each of which may impose their unique administrative requirements on a service provider. Under the prior art, secure server administration must be configured to meet all known unique user access or administration requirements, and must generally be scalable to serve new additional requirements as needed. Thus, differentiated service provision imposes large costs and inefficiencies when implemented and administered at the server level.

SUMMARY OF THE INVENTION

In general, the present invention provide methods, systems, and program products for a client application providing a child password mapped to a parent password to a child user, the parent password authorized for login to a secure network resource server. A child user logs in to the client application by entering the child password, the client application applying an access rule associated with the child password to the child user login session. When a child user properly requests a secure resource from the secure network resource server, the client application uses the authorized parent password to login to the secure server and retrieve a secure resource without communicating the child password to the secure server. The child user login session is administered by the local application pursuant to access rules or limitation parameters associated with the child password, and may deny a child user request or end the session without action by the secure resource server.

In one aspect, the child password expires upon the occurrence of an expiration event. Exemplary expiration events include expiration of an elapsed period of time, a total number of child user logins and a child user login frequency threshold. In another aspect, the client application monitors access of the secure server by the child user. Use of the child user may also be reported, and an access rule may be revised in response to monitoring access and use reporting.

In one aspect, a client application generates a secondary password element, which is associated with the child password for use in logging in. In one example, the secondary password element is a random number generated by a random number generator. In one aspect, a child user must login on a specific terminal device comprising the secondary password element generator.

In another aspect, a second client application maps a second child password to the parent password. Second child users commencing a login session with the second child password may acquire secure resources at a different security level. In another aspect, the client application differentiates access to the secure resource server dependent upon a first child password, a second child password or a parent password.

In one aspect, a local client application system configured to communicate with a secure network server system according to the present invention includes an authorizer configured to authorize a parent password login to the local client application, the parent password also authorized for login by the secure network server; a client access limitation setter configured to set a password limitation parameter; and a child password mapper configured to map a child password with the child password limitation parameter to the parent password. The authorizer is configured to commence a child user login session in response to entry and validation of the child password, and the client application is configured to request a secure resource from the network server by logging the parent password into the secure server without communicating the child password to the secure server, the request in compliance with at least one of the child password limitation parameter and an access rule.

In one aspect, a local client application system further comprises a rule-dependent access provider component configured to allow a child password user to access the secure resource residing on the secure server pursuant to at least one of the child password limitation parameter and the access rule; a monitor component configured to monitor child password user activity; a notifier component configured to report the monitored use of the child password; and a rule reviser component configured to revise at least one of the child password limitation parameter and the access rule in response to the monitor and the notifier.

In another aspect, a method is provided for producing computer executable program code, storing the produced program code on a computer readable medium, and providing the program code to be deployed to and executed on a computer system, for example by a service provider who offers to implement, deploy, and/or perform functions for others. Still further, an article of manufacture comprising a computer usable medium having the computer readable program embodied in said medium may be provided. The program code comprises instructions which, when executed on the computer system, cause the computer system to deploy a local client application configured to communicate with a secure network server system.

A local client application thus provides a child password mapped to a parent password to a child user, the parent password authorized for login to a secure network resource server; commences a login session by receiving a child password entry; applies an access rule associated with the child password to the login session; and enables the child user to request a secure resource from the secure network resource server through the client application. In response to applying the rule, the local computer infrastructure is further operable to use the authorized parent password to login to the secure server, retrieve a first secure resource from the secure server, and present the first secure resource to the child user without communicating the child password to the secure server; deny the child user request; or end the session.

In one aspect, the local client application is further configured to monitor access of the secure server by the child user and report the monitored use. In another aspect, the local client application is further configured to revise the rule in response to at least one of access monitoring and access reporting. In still another aspect, the local client application generates a secondary password element; associates the secondary password element with the child password; and commences the login session by requiring entry of the child password and the secondary element.

BRIEF DESCRIPTION OF THE DRAWINGS

These and other features of this invention will be more readily understood from the following detailed description of the various aspects of the invention taken in conjunction with the accompanying drawings in which.

Figure 1:
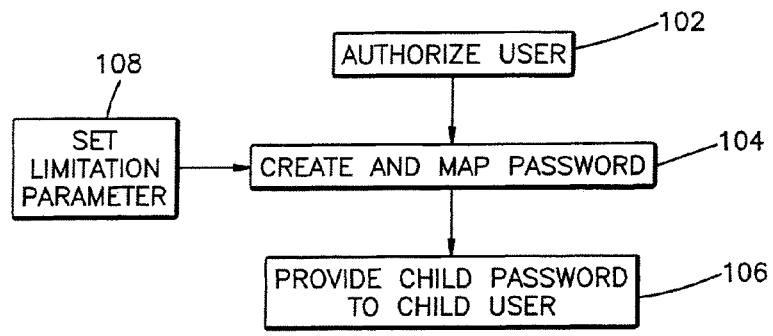
FIG. 1 illustrates a method for providing passwords according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
 I. General Description
 II. Computerized Implementation
I. General Description The security of a secure resource password system is dependent upon password security. In general, an authorized user is recognized by providing identity indicia (such as a user name) along with a unique password associated with the user identity indicia, with access to secure resources conditional upon thus providing evidence of identity (e.g. entry of user name) as confirmed by entry of a unique password. However, password only entry without a separate user name or other identity indicia input requirement may be sufficient in some systems or methods to grant secure resource access: thus, it is to be understood that the concept of password entry according to the present invention contemplates both password only entry and password/user identity indicia combination inputs. By keeping a password confidential or otherwise assuring that only an authorized user can enter the password, unauthorized users are prevented from "spoofing" a secure server or otherwise representing themselves as an authorized user to gain secure resource access.

A variety of password presentation techniques may be practiced, each affording varying degrees of security. For example, some passwords have an inherently secure nature, such as biometric password inputs provided by fingerprint or retina scanning apparatus data inputs; these techniques enable "passive" or background password presentation and assure security by requiring that the actual authorized user physically initiate the password entry. However, an authorized user may nonetheless compromise system security by entering a biometric password through a terminal device interface and then turning control of the now-authorized device over to an unauthorized user.

Some password systems require active password inputs, such as by prompting a user for entry of a password in a specified field in a login interface. System security is provided in part by requiring that each user keep their unique password(s) confidential and undisclosed to unauthorized parties, in order to prevent their unauthorized use by third parties. However, intentional divulgation to a third party to enable their secure resource access, or loss of confidentiality and/or control of a unique password, may easily and irreparably compromise system security until the password is deactivated or cancelled by secure system administration.

FIG. 1 illustrates a method for access to secure computer system resources according to the present invention. At 102 an authorized user enters an authorized user password (and optionally also provides a user name or other identity indicia input associated therewith) and is recognized and authorized for secure resource access by a local client terminal device application, such as an application residing on a computer or personal digital assistant (PDA). More particularly, the user may now access secure resources residing on a secure server system in communication with the local client terminal device through the terminal device application, typically effected by the local client application presenting the user password to the secure server. At 104 the local client application creates and maps one or more "child" passwords to the "parent" authorized user password entered at 102, wherein login to the local client device application with the parent or one of the child passwords enables the client application to present the parent password to the secure network server device to access secure resources. And in one embodiment, the child password access is limited or administered pursuant to one or more rules associated with each child password. A child password may then be made available to a "child" third party by an authorized parent user or other distributive entity at 106, wherein each child password enables at least limited secure resource access through a local client secure system login procedure.

Mapping a child password to an authorized user's parent password enables a child password user to appear to a secure service provider as the parent password user, the child user essentially appearing to the secure server as a parent user. Thus, the secure server need not recognize the child password nor must it be communicated to the service provider. The service provider only sees a request from the primary password user, and child user access is kept local in a local client terminal device application. Thus, the client application may function as an abstraction layer between the secure resource and child password users.

Providing local client application administration of parent and child passwords and secure resource access provides advantages in reducing secure server administration overhead. In one aspect, only full-access parent password access and privileges need be recognized and managed at the secure server level, regardless of variations in end user access. The overhead in providing divergent access is instead born by each local client application. This also provides efficiencies in creating multiple levels of secure resource access, each defined by any one of a plurality of local client applications, in that one secure server application may be efficiently expanded to an unlimited plurality of divergent child password access schemes in an incremental fashion, by creating additional local client applications as needed, each configured to uniquely communicate with the secure server through a common parent password login procedure.

Child passwords can be created through a variety of manual or automatic generation methods and systems. In one example, a parent or child password user directly sets or defines a child password through keystroke input techniques. In another example, a child password requested by a parent user is generated by the local client application and provided for distribution to a child user for login. System security may also be enhanced by associating a unique secondary password element with a child password, which must also be entered to gain access to the secure resources; thus, theft or other loss of child password control or confidentiality will not compromise system security unless the second password element is also known and entered. In one embodiment, a random number generator creates a random number secondary password element which must be entered along with child user identity indicia (for example, a login ID or user name) and the child password to log into the local client application. The combination of user name, child password and secondary random number element creates a unique one-way key, thus adding an extra level of security, which may be further enhanced by limiting access availability to specific terminal devices that know and can validate the secondary random number element.

Child passwords may be distributed, managed and even terminated independent of the status of their parent password. In one aspect, child passwords may include one or more access limitation parameter(s) set at 108 that differentiate or limit access to secure resources relative to parent password or other child password access. Limitation parameters may be set at the creation of a child password by one or more of a requesting parent authorized user, the local client application, a system administrator or a specific secure resource access rule provided by a secure resource application, though other means will be apparent and the present invention is not limited to the examples described herein. Limitation parameters may also be triggered, set or revised subsequent to child password creation.

In one exemplary embodiment, a time limit parameter is set at 108 that provides for expiration of the child password after the elapse of a predetermined time limit. In another embodiment, an access frequency parameter set at 108 may invalidate the child password after a predetermined threshold number of uses over a predetermined time frame has been met or exceeded. In still another example, a child password set at 108 may allow a specified maximum total number of logins independent of any time period and expire upon meeting a threshold number.

Still further, an access rule revision on either the local or secure server level results in a limitation parameter revision. In another example, child password user behavior is monitored by one or more of the parent user and the local client application, and the limitation parameter is accordingly manually or automatically revised in response to one ore more observed child user events. In some embodiments, child user monitoring is performed and offered to a parent user on a subscription basis by a service provider.

The present invention also provides for differentiated child password secure resource access. Thus, the local client application may administer secure resource access by limiting or excluding access to secure resource subsets in response to a specific child password and/or limitation parameter associated therewith. For example, where a parent password user may have access to a customer list, a child password user request access to said list may be denied by the local client application and not transmitted to the secure server as a result of an access parameter defined at 108. Or a parent user may have to enter confidential personal information, such as a social security number, in order to log in through a parent password. This data query may be withheld from presentation to a child user in response to an access parameter defined at 108, and information requiring such an input for authorization will be accordingly inaccessible to the child user. Thus, in one respect from a child user's perspective, the present invention abstracts away the details of what happens at the parent level, the child password user instead experiencing a different process.

Figure 2:
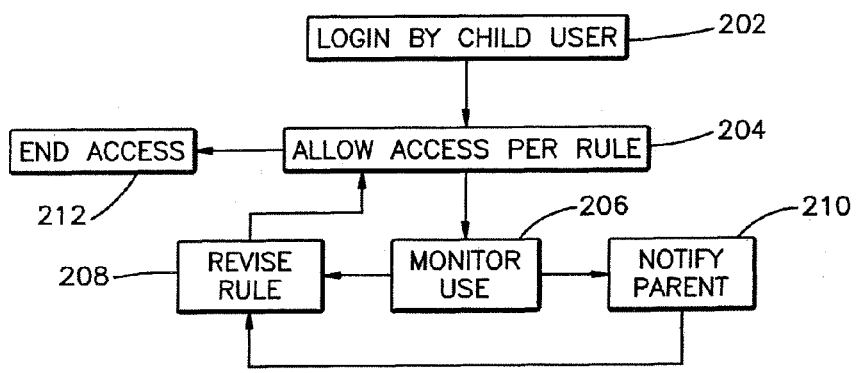
FIG. 2 illustrates a method for deploying a password according to the present invention.

FIG. 2 illustrates an exemplary implementation of a child password by a child user. At 202 a child user logs in to a local client application with the child password. In some embodiments, a unique child user ID or user name and/or a secondary child password element (for example, a random number or a biometric input or other unique element) must also be entered, including as discussed above. At 204 the child user is validated and granted access to the secure server by the local application pursuant to access rules associated with the child password and/or one or more child password limitation parameters, for example as discussed above. The child user thus enjoys access to the secure resource through the client application until the process is ended at 212 pursuant to a user log-off or an access rule application.

Child user behavior may also be monitored by the local application at 206. In particular, the local application may be configured to respond in one or more fashions upon the occurrence of one or more events observed at 206. Event examples include those discussed above, though other events may be observed. In response to observing at least one event occurrence at 206, the local application revises an access rule at 208, notifies a parent user at 210 and/or ends the secure resource login process at 212.

Notification to the parent user of an event at 210 may result in the parent user actively revising a rule at 208, though it will also be understood that an access rule revision at 208 may also occur independent of behavior observed at 206. An access rule revision at 208 may also comprise a child password limitation parameter revision. After a rule revision at 208, child user access continues pursuant to the revised rule at 204, expanding or contracting the child user's access to secure resources accordingly.

II. Computerized Implementation

Figure 3:
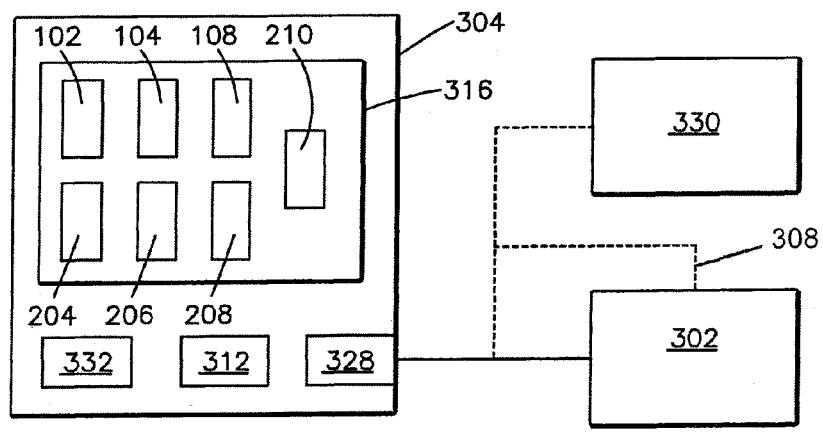
FIG. 3 illustrates a computer system appropriate for practicing the present invention.

Referring now to FIG. 3, an exemplary computerized implementation of a local client application according to the present invention and described generally above includes a local computer system 304 in communication through a network computer infrastructure 308 with a secure resource server 330 configured to enable local client access to secure resources residing thereupon. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the computer infrastructure 308 is intended to demonstrate that some or all of the components of a local client application implementation could be deployed, managed, serviced, etc. by a service provider who offers to implement, deploy, and/or perform the functions of the present invention for others.

Thus, secure resources residing on one or more secure resource service provider server devices 330 are accessed from the local client computer 304 through a communication interface 328. A wide variety of terminal devices 304 may be practiced with the present invention, illustratively including local computers, personal digital assistants (PDA's) and cellular telephones. However, it is to be understood that the present invention is not limited to these specific examples and embodiments discussed herein, and other types of terminal devices 304 may be appropriate for use with the present invention, some of which may be apparent to one skilled in the art.

As shown, the local computer system 304 includes a processing unit 312, a memory 316 and input/output (I/O) interfaces 328. Further, the computer system 304 is shown in communication with external I/O devices/resources 302 and a storage system 332. In general, the processing unit 312 executes computer program code, such as the code to implement the local client application discussed above, which is stored in the memory 316 and/or the storage system 332. It is to be appreciated that two or more, including all, of these components may be implemented as a single component structure.

While executing computer program code, the processing unit 312 can read and/or write data to/from the memory 316, the storage system 332, and/or the I/O interfaces 328. The external devices 302 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, the I/O interfaces 324 can comprise any system for exchanging information with one or more of the external devices 302. Still further, it is understood that one or more additional components (e.g., system software, math co-processing unit, cache memory, communication systems, etc.) not shown in FIG. 3 can be included in computer system 304. However, if computer system 304 comprises a handheld device or the like, it is understood that one or more of the external devices 302 (e.g., a display) and/or the storage system 332 could be contained within the computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown).

Shown in the memory 316 of computer system 304 are software logic components of the local client password system of the present invention, which includes the authorizer 102, an access limitation setter 108, child password mapper 104, rule dependent access provider 204, rule reviser 208, monitor 206 and notifier 210. These components perform the functions discussed above. Specifically, the password mapper 104 generates one or more child passwords with limitation parameters set by the access limitation setter 108 upon initiation by a parent user recognized and authorized by the authorizer 102. The rule-dependent access provider 204 then allows a child password user to access secure resources residing on the secure server 330 through the network communication system 328/308 pursuant to appropriate access rules and/or child password limitation parameters, each of which may be revised by the rule reviser 208 during granted access. Child password user activity is monitored by the monitor 206, and child user event notifications provided to parent password users by the notifier 210.

While shown and described herein as methods and systems for password-dependent access to secure network resources, it is understood that the invention further provides various alternative embodiments. For example, in one embodiment, the invention provides a computer-readable/useable medium that includes computer program code to enable a computer infrastructure to provide password-dependent local access to secure network resources. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network 308 (e.g., during a wired/wireless electronic distribution of the program code).

In another embodiment, the invention provides a business method that performs the process steps of the invention on a subscription, advertising, and/or fee basis. That is, a service provider could offer to manage password-dependent access to secure network resources through the components and steps described above. In this case, the service provider can create, maintain, and support, etc., a computer infrastructure, such as the computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the password-dependent access application described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. Still yet, any of the components of the present invention could be deployed, managed, serviced, etc. by a service provider who offers to manage password-dependent access to secure network resources through the components and steps described above.

We claim:

1. A method for a client to access a secure network resource server through use of a child password mapped to an authorized parent password, the method comprising:
    mapping a child password to a parent password, the parent password authorized for login to a secure network resource server;
    a child user commencing a login session in a client computer that is in communication with the secure network resource server by entering the child password into the client computer;
    the child user requesting a secure resource from the secure network resource server through the client computer; and
    in response to the child user requesting the secure resource, the client computer applying an access rule associated with the child password to the child user request and, without communicating the child password to the secure server:
        presenting the authorized parent password to login to the secure server, retrieving a first secure resource from the secure server, and presenting the first secure resource to the child user if a parameter of the request meets a limitation of the associated rule; or
        denying the child user request to the secure resource and ending the session if the request parameter does not meet the associated rule limitation.

2. The method of claim 1, further comprising expiring the child password if the request parameter does not meet the associated rule limitation, the request parameter not meeting the associated rule limitation indicating an occurrence of an expiration event, the expiration event is at least one of an expiration of an elapsed period of time, a total number of child user logins exceeding a maximum number of permissible logins and a child user login frequency exceeding a maximum permissible login frequency.

3. The method of claim 2 further comprising:
    the client computer monitoring access of the secure server by the child user; and
    reporting the monitored use of the child user.

4. The method of claim 3 further comprising revising the associated rule limitation parameter in response to the monitoring access.

5. The method of claim 2 further comprising:
    generating a secondary password element; and
    associating the secondary password element with the child password;
    and wherein the step of the child user commencing the login session by entering the child password further comprises the child user also entering the secondary element.

6. The method of claim 5, further comprising a random number generator generating the secondary password element.

7. The method of claim 5, wherein the associated rule limitation further requires the child user to commence the login session on a specific terminal device that generates the secondary password element; and further comprising denying the child user request to the secure resource and ending the session if the child user does not commence the login session on the specific terminal device.

8. The method of claim 2, further comprising:
the associated rule limitation differentiating access to the secure resource server dependent upon a child or a parent password login session status of the request; and
denying the child password user request to the secure resource and ending the session if the request is for access to a secure resource subset limited to a parent password login session request status.

9. A system, comprising:
a processing unit, computer readable memory and a computer readable storage system;
first program instructions to map a child password to a parent password, the parent password authorized for login to a secure network server;
second program instructions to apply an access rule associated with the child password to a child user login session and to commence a child user login session in response to entry and validation of the child password; and
third program instructions to, in response to the child user requesting the secure resource, apply the associated access rule to the child request and, without communicating the child password to the secure server:
present the authorized parent password to login to the secure server, retrieve a first secure resource from the secure server, and present the first secure resource to the child user if a parameter of the request meets a limitation of the associated rule; or
deny the child user request to the secure resource and end the session if the request parameter does not meet the associated rule limitation; and
wherein the first, second and third program instructions are stored on the computer readable storage system for execution by the processing unit via the computer readable memory.

10. The system of claim 9, wherein the third program instructions are further to:
monitor child password user activity;
report the monitored child password user activity; and
revise the associated access rule limitation parameter in response to the monitoring the child password user activity.

11. The system of claim 10 wherein the third program instructions are further to expire the child password if the request parameter does not meet the associated rule limitation, the request parameter not meeting the associated rule limitation indicating an occurrence of an expiration event, and the request parameter is at least one of an elapsed time parameter, a maximum login number parameter, and a maximum login frequency parameter.

12. The system of claim 11, wherein the first program instructions are further to generate a secondary password element and associate the generated secondary password element with the child password; and
wherein the second program instructions are further to commence a child user login session in response to entry and validation of the child password and the associated secondary password element.

13. The system of claim 12 wherein the first program instructions are to use a random number generator to generate the secondary password element as a random number.

14. The system of claim 13 wherein the third program instructions are further configured to require a child user to login on to a specific terminal device comprising the secondary password element generator, and to deny the child user request to the secure resource and end the session if the child user does not commence the login session on the specific terminal device.

15. The system of claim 11 wherein the second program instructions are further to differentiate access to the secure resource server dependent upon a child or a parent password login session status of the request; and
the third program instructions are further to deny the child password user request to the secure resource and end the session if the request is for access to a secure resource subset limited to a parent password login session request status.

16. A service for local client communication with a secure network server system, the service comprising:
providing a computer infrastructure that:
maps a child password to a parent password, the parent password authorized for login to a secure network resource server;
applies an access rule associated with the child password to a child user login session and commences a login session in response to entry and validation of the child password; and
in response to the child user requesting a secure resource from the secure network resource server, applies the associated access rule to the child request and, without communicating the child password to the secure server:
presents the authorized parent password to login to the secure server, retrieve a first secure resource from the secure server, and present the first secure resource to the child user if a parameter of the request meets a limitation of the associated rule; or
denies the child user request and ends the session if the request parameter does not meet the associated rule limitation.

17. The service of claim 16 wherein the computer infrastructure further monitors access of the secure server by the child user and reports the monitored use.

18. The service of claim 17, wherein the computer infrastructure further revises the associated access rule limitation parameter in response to the monitored access of the secure server by the child user.

19. A computer program product for local client communication with a secure network server system, the computer program product comprising:
a computer readable storage device;
first program instructions to map a child password to a parent password, the parent password authorized for login to a secure network server;
second program instructions to apply an access rule associated with the child password to a child user login session and to commence a child user login session in response to entry and validation of the child password; and
third program instructions to, in response to the child user requesting the secure resource, apply the associated access rule to the child request and, without communicating the child password to the secure server:
present the authorized parent password to login to the secure server, retrieve a first secure resource from the secure server, and present the first secure resource to the child user if a parameter of the request meets a limitation of the associated rule; or
deny the child user request to the secure resource and end the session if the request parameter does not meet the associated rule limitation; and wherein the first, second and third program instructions are stored on the computer readable storage device.

20. The computer program product of claim 19, wherein the third program instructions are further to:
monitor child password user activity;
report the monitored child password user activity; and
revise the associated access rule limitation parameter in response to the monitoring the child password user activity.

21. The computer program product of claim 20, wherein the third program instructions are further to expire the child password if the request parameter does not meet the associated rule limitation, the request parameter not meeting the associated rule limitation indicating an occurrence of an expiration event, and the request parameter is at least one of an elapsed time parameter, a maximum login number parameter, and a maximum login frequency parameter.

22. The computer program product of claim 21, wherein the first program instructions are further to use a random number generator to generate a secondary password element random number and associate the generated secondary password element random number with the child password; and
wherein the second program instructions are further to commence a child user login session in response to entry and validation of the child password and the associated secondary password element random number.

23. The computer program product of claim 22, wherein the third program instructions are further configured to require a child user to login on to a specific terminal device comprising the secondary password element random number generator, and to deny the child user request to the secure resource and end the session if the child user does not commence the login session on the specific terminal device.

24. The computer program product of claim 21, wherein the second program instructions are further to differentiate access to the secure resource server dependent upon a child or a parent password login session status of the request; and
the third program instructions are further to deny the child password user request to the secure resource and end the session if the request is for access to a secure resource subset limited to a parent password login session request status.

* * * * *